United States Patent [19]

Snell

[11] Patent Number: 5,547,373
[45] Date of Patent: Aug. 20, 1996

[54] BAKING OVEN WITH INTEGRAL EMISSIONS CONTROL APPARATUS

[75] Inventor: Richard E. Snell, Raleigh, N.C.

[73] Assignee: APV Baker, Inc., Grand Rapids, Mich.

[21] Appl. No.: 129,595

[22] Filed: Sep. 30, 1993

[51] Int. Cl.⁶ .................................................. A21B 1/00
[52] U.S. Cl. .............................................. 432/72; 126/21 R
[58] Field of Search .................................. 34/79, 80, 467, 34/478, 479, 480; 126/21 R; 432/72

[56] References Cited

U.S. PATENT DOCUMENTS

| | | |
|---|---|---|
| 1,829,670 | 10/1931 | Reese . |
| 2,610,411 | 9/1952 | Steese . |
| 2,658,742 | 11/1953 | Suter et al. . |
| 2,804,694 | 9/1957 | Clipsham . |
| 2,846,557 | 8/1958 | Schulze et al. . |
| 2,921,778 | 1/1960 | Ruff . |
| 2,950,098 | 8/1960 | Ruff . |
| 3,106,386 | 10/1963 | Harris . |
| 3,183,605 | 5/1965 | Argue et al. . |
| 3,351,329 | 11/1967 | Thomas . |
| 3,561,928 | 2/1971 | Weber . |
| 3,604,824 | 9/1971 | Hardison . |
| 3,706,445 | 12/1972 | Gentry . |
| 3,882,612 | 5/1975 | Try et al. . |
| 4,098,007 | 7/1978 | Davis et al. ................ 432/72 X |
| 4,270,898 | 6/1981 | Kelly ........................... 432/72 X |
| 4,504,220 | 3/1985 | Sunakawa et al. . |
| 4,702,892 | 10/1987 | Betz . |
| 4,938,410 | 7/1990 | Kondo . |
| 4,941,819 | 7/1990 | Stewart et al. . |
| 5,112,220 | 5/1992 | Wimberger et al. . |
| 5,127,827 | 7/1992 | Hoetzl et al. . |
| 5,129,384 | 7/1992 | Parks . |

*Primary Examiner*—Henry A. Bennett
*Assistant Examiner*—Sid Ohri
*Attorney, Agent, or Firm*—Price, Heneveld, Cooper, DeWitt & Litton

[57] ABSTRACT

An apparatus for baking a dough-type product includes an oven having an enclosure, a product supporting conveyor in the enclosure, burners positioned to heat the product, and an integrally associated emissions control device for controlling emissions emanating from the product while baking. A recirculating system for controllably directing air from the oven to and from the emissions control device is integrated into or with the oven, and preferably positioned in the oven enclosure. A heat exchanger is operably connected to the emissions control device and the recirculation system so that a first portion of contaminated air collected by the recirculating system in the enclosure is communicated to the emissions control device for cleaning and then through the heat exchanger for cooling before being vented to atmosphere, while a second portion of the contaminated air collected by the recirculating system is communicated through the heat exchanger to gain added heat while also cooling the air to be vented to atmosphere, and it is then recirculated back to the oven enclosure. The recirculating system is controlled to handle surges in the alcohol level of contaminants emitted from the product and also surges in water vapor content in the contaminated air which comes both from the product and ambient air, the first portion of air after cleaning may be selectively fed back into the oven as desired for additional energy savings in the baking process, and the apparatus can be (but is not necessarily) constructed to use this as the source of all or most of the heat for the baking process in the oven.

17 Claims, 4 Drawing Sheets

BAKING OVEN WITH INTEGRAL EMISSIONS CONTROL APPARATUS

BACKGROUND OF THE INVENTION

The present invention relates to ovens with emissions controls, and more particularly to a baking oven having an integrated emissions control apparatus, i.e., emissions control apparatus which is intimately associated with and preferably incorporated directly into the baking oven for more efficient operation, energy and structural cost savings, and better control of emissions.

Industrial bakeries, principally those producing bread and buns, use a process of fermentation in order for the dough to rise and to insure the taste, texture and keeping qualities of the product. The fermentation produces alcohol as a byproduct. This alcohol is normally evaporated during the baking process, and is vented up the exhaust flues of the oven along with the moisture that is also driven off the dough during baking. Environmental studies have shown that alcohol is an ozone precursor, breaking down in the presence of sunlight to produce ozone and a series of other unstable and potentially hazardous chemical compounds. Environmental legislation is increasingly requiring the control of this type of emission, normally by its removal (i.e. condensation or biological breakdown) or destruction by intense heat. Current practice is to process the exhaust emissions through either a thermal incinerator operating in excess of 1400° F. or a catalytic oxidizer running at lower temperatures around 700° F. In both the thermal incinerator and the catalytic oxidizer, the alcohol and most other inorganic compounds that may be present are converted to carbon dioxide and water.

Devices to achieve this processing are typically large and heavy and require the construction of massive steel platforms or the like, which are typically located on the roof. Most roof installations require substantial reinforcements, which usually must be added to existing buildings, and so are relatively expensive and inconvenient. In addition, elongated and complex insulated ductwork with automatically operated dampers has to be built in order to connect such distain emissions control equipment with the oven, to allow the oven combustion safety equipment to function properly and to prevent premature condensation of water, alcohol or the vapors from the hot pan grease. Mishandling of the water, alcohol and vapors can cause corrosion as well as risk of fire.

Additionally, the cost of supplying the heat to raise the temperature of the exhaust gases from the baking temperatures of 350°–400° F. to either 700° F. (for a catalytic oxidizer) or 1400° F. (for a thermal incinerator) requires considerable amounts of fuel, adding to the costs of operating the bakeries. Although there are recuperation systems in use to reduce this fuel expense, the unsteady nature of the flow of alcohol in a working bakery puts practical limits on the efficiency of recuperation that can be employed. In addition, the extensive and complex ductwork and incinerator itself carries the long-term risk of cracking brought about by thermal expansion and contraction, which will give rise to leaking of the gases that must be controlled. This is either ignored or in better designed systems the fan moving the air in the oxidizers is positioned so that the "dirty" gas stream is under partial vacuum. The partial vacuum causes any leakage to be into the system rather than out of it. While effective, operating the fan at a partial vacuum increases considerably the size and power of the circulating fan required, thus increasing the electrical running costs of the unit.

Other industries, principally paint and printing industries have used systems which make use of exhaust gases with an inflammable content to fuel the heating of the ovens. These applications differ from the baking situation in that the stream of product is consistent, and it is practical to use the product as part of the primary heating. The alcohol in the bakery application is mixed with a very large amount of water vapor, which makes such use impractical for a number of the simpler recycling systems. Further, in the relatively closed atmosphere of a bakery oven the oxygen content of the atmosphere can easily be reduced seriously by repeated recycling, giving rise to combustion problems in the oven burners.

Thus, an apparatus solving the aforementioned problems is and has for quite some time been sorely needed in the baking art.

SUMMARY OF THE INVENTION

The present invention includes an apparatus for baking a product, the product releasing environmentally undesirable contaminates during baking which contaminate hot air circulated to bake the product. The apparatus includes an oven including an enclosure with walls, means for heating the product in the enclosure and means for holding the product in the enclosure. The apparatus further includes an emissions control device constructed to eliminate the undesirable contaminates from the hot air in the oven by addition of thermal energy to the contaminated hot air. A recirculation system is operably connected to the oven and the emissions control device for recirculating the hot air in the enclosure. The emissions control device is integrally associated with and proximately located to the enclosure so that the thermal energy generated by the emissions control device can be readily communicated into the hot air being circulated in the enclosure, whereby the integral association of the emissions control device with the recirculation system and the enclosure facilitates installation, operation and maintenance of the apparatus.

In another aspect, the invention includes an emissions control and recirculating apparatus for an oven including an oven having an enclosure; an emissions control device for controlling emissions from items being baked in the oven, the emissions control device being located substantially entirely within the enclosure; and a recirculation system for recirculating air in the oven and through the emissions control device.

In a further aspect, clean air purified by the emissions control device is fed partially back into the oven to give additional control over the application of heat to the oven and also help maximize thermal efficiency.

An object of the present invention is to integrate emissions control apparatus into various types of bakery ovens to eliminate the problems inherent in external installations, such problems including leakage of contaminated air from poorly sealed ducts or ducts cracked from repeated temperature cycling, expensive sealed and insulated ductwork, and expensive and massive support structure. A further object of the invention is to more efficiently reuse the heat generated in the oxidation process to improve the efficiency of the baking oven. A further object is to apply the reclaimed heat to the product being baked, as opposed to attempting to recycle reclaimed heat into the oxidizer. Still further, an object is to provide an apparatus which controls the heat variations caused by the unstable flow of alcohol emitted from the baking dough to insure that the oven performs in a consistent and controllable manner.

These and other features, advantages and objects of the present invention will be further understood and appreciated by those skilled in the art by reference to the following specification, claims and appended drawings.

Figure 8:
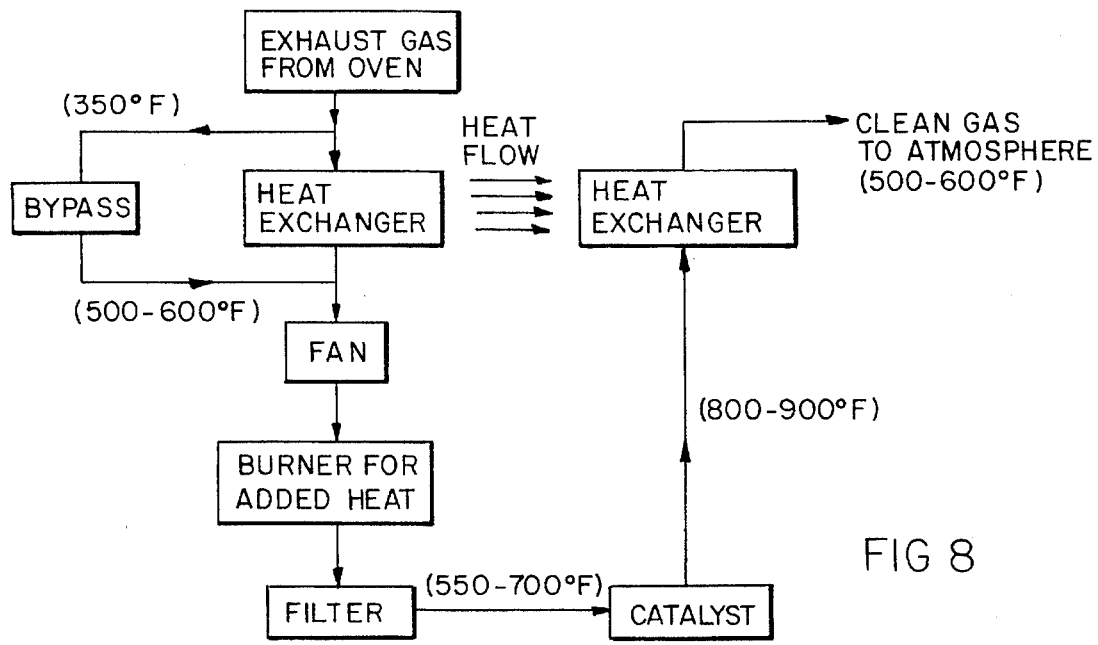
FIG. 8 is a functional block diagram illustrating the air flow and general operation of the apparatus of FIG. 6.
Figure 6:
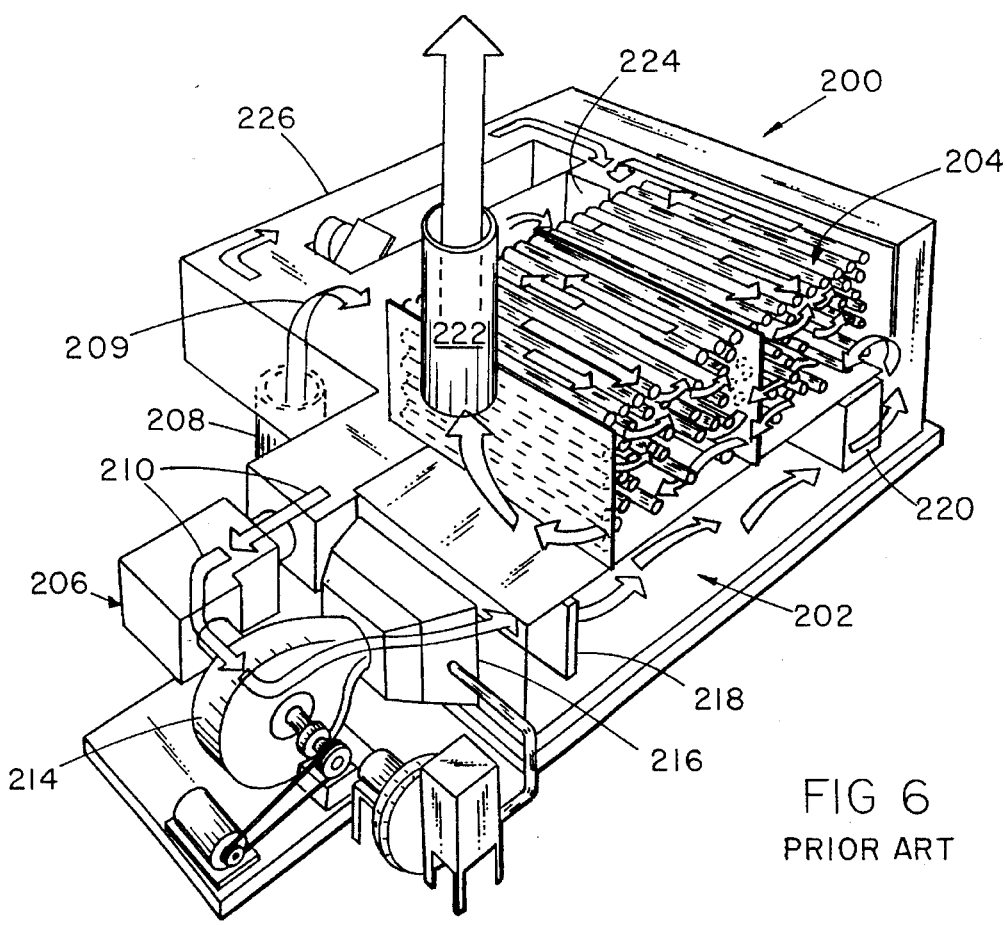
FIG. 6 is a partially broken-away perspective view of a known emissions control device of a type adapted and intended for installation on a building roof.

An emissions control device 200 (FIG. 6) generally known heretofore is shown including an emissions control chamber 202, a heat exchanger 204, and a recirculating system 206 interconnected with emissions control chamber 202 and heat exchanger 204. Recirculating system 206 includes an inlet duct 208 for contaminated air 209 which is preheated by the heat exchanger 204 and then drawn as a first air stream 210 by a fan 214 and forced by the latter into and through emissions control chamber 202. Emissions control chamber 202 includes a low NOx burner 216, a ceramic filter 218 and a catalyst 220. Air flowing through emissions control chamber 202 is heated and then catalyzed to eliminate emissions in the air such as alcohol emissions from the baking of bread. The first air stream 210 is then fed through the air cooling portion of heat exchanger 204 and is vented through exhaust stack 222 to a remote location. An auxiliary duct 226 connected between inlet duct 208 and return duct 224 will allow bypassing of some of the contaminated inlet air 209 being fed into the heat exchanger 204 when the gases at the catalyzer 220 become too hot, by action of a control valve 227 as may for example happen when a surge of high alcohol content air is received by emissions control device 200. When this occurs, the air so bypassed enters the stream 210 directly, without preheating. Emissions control device 200 is mounted on support structures 228 and 230 and located remotely from the oven. The functional block diagram shown in FIG. 8 illustrates the path of air flow in and through emissions control device 200, as well as the general operation thereof, as will be appreciated upon consideration of this diagram after reading the foregoing description.

DETAILED DESCRIPTION OF THE PREFERRED EMBODIMENT

Figure 1:
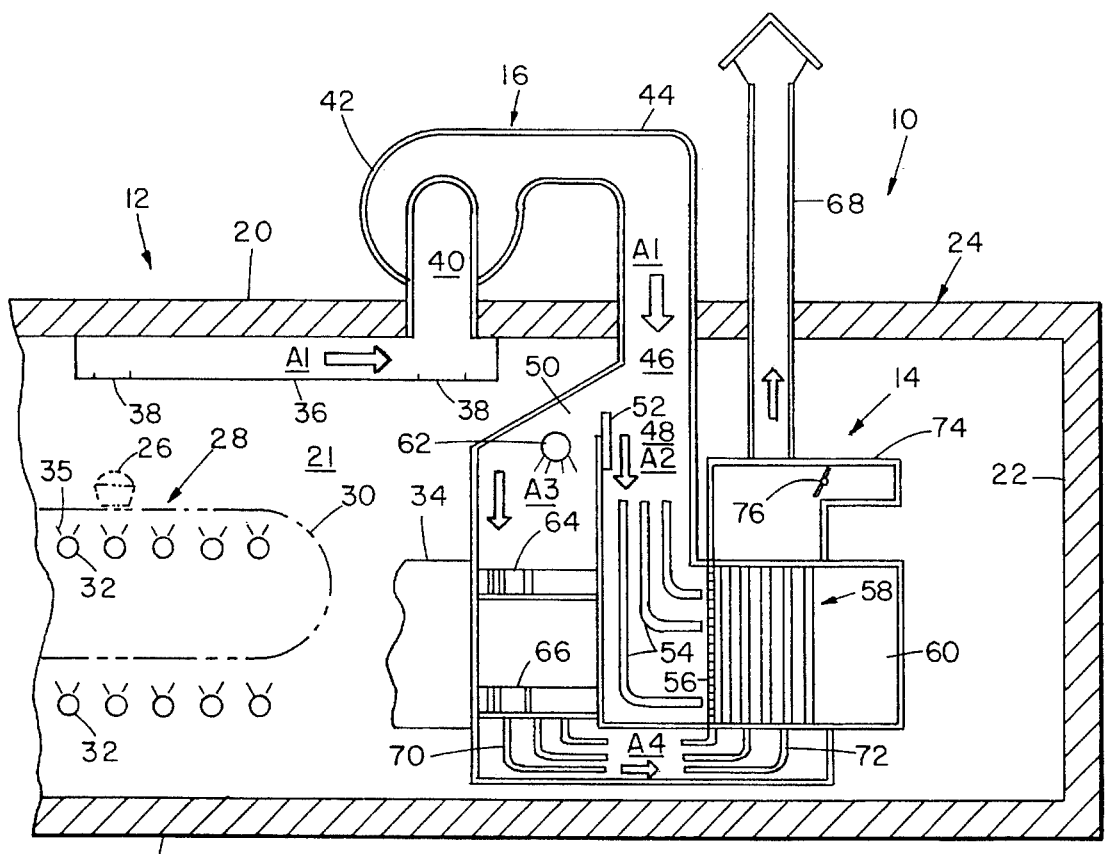
FIG. 1 is a side elevational cross-sectional view of a baking oven embodying the present invention, the baking oven including an integral emissions control apparatus.
Figure 2:
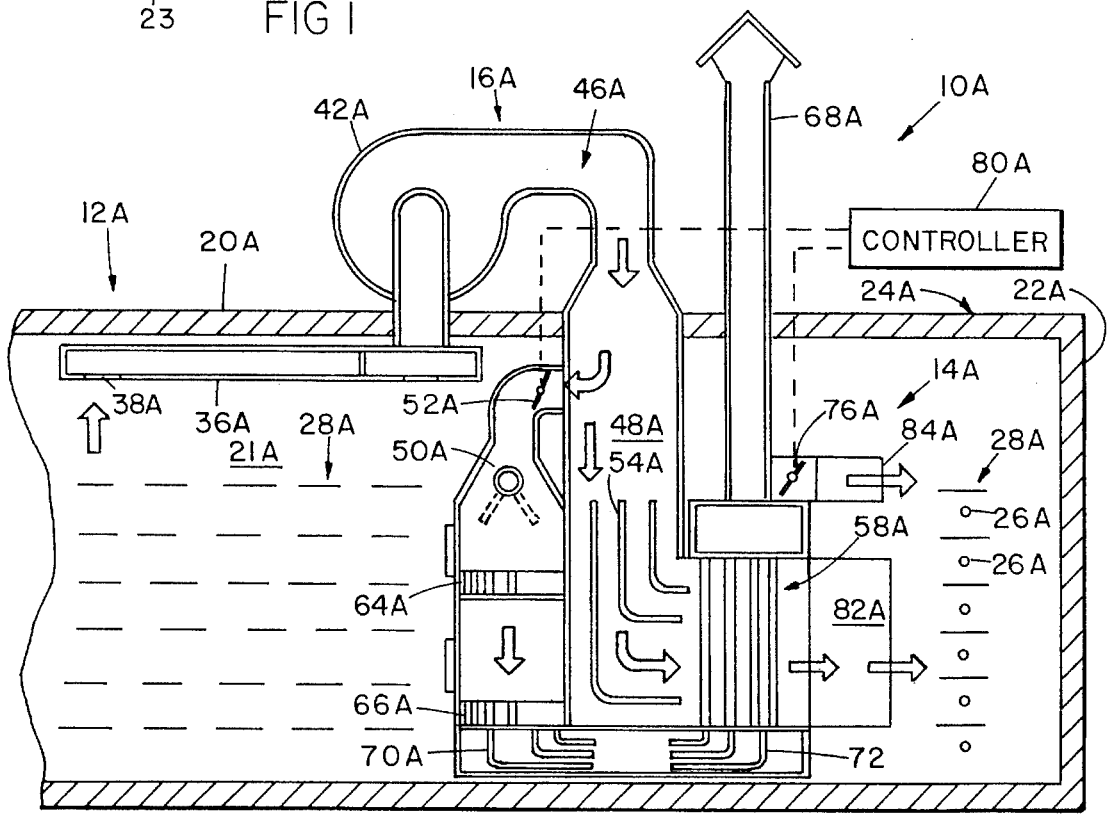
FIG. 2 is a side elevational cross-sectional view of a second embodiment oven of the present invention.
Figure 3:
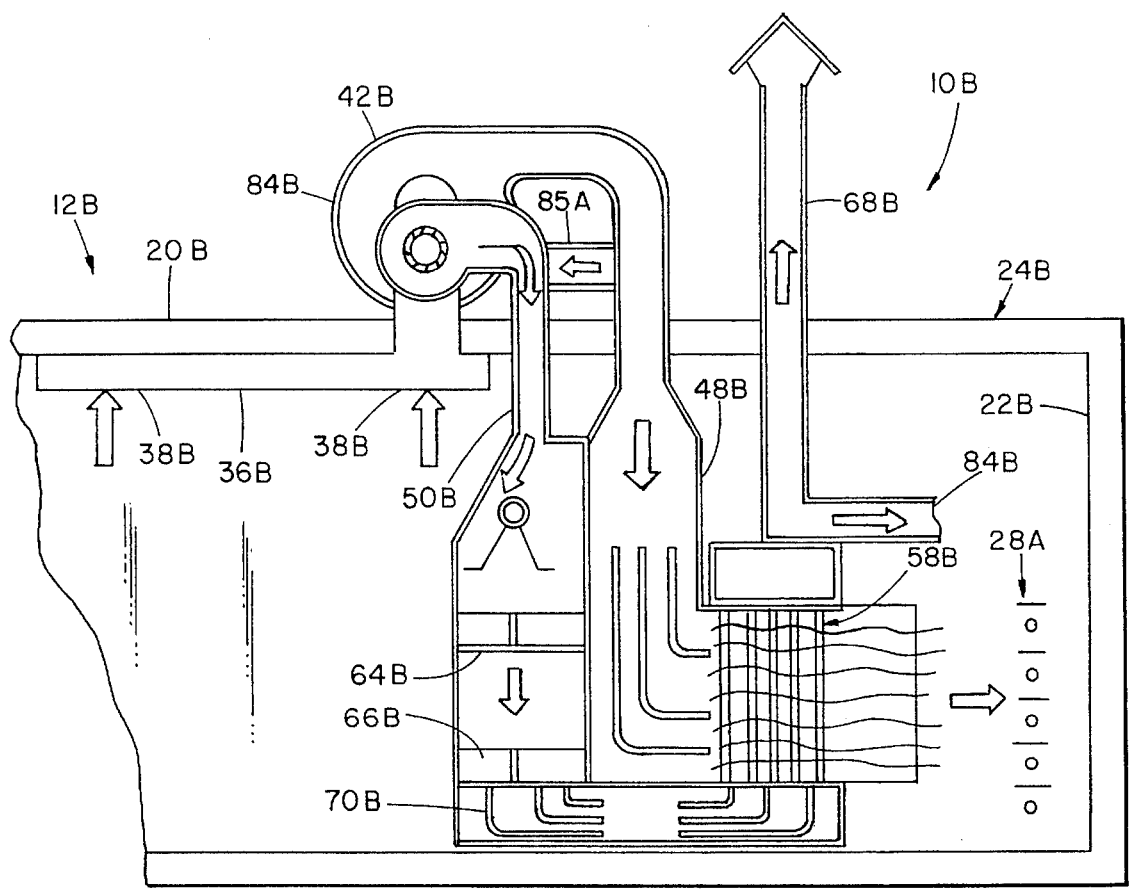
FIG. 3 is a side elevational cross-sectional view of a third embodiment oven of the present invention.

An apparatus 10 (FIG. 1) embodying the present invention includes a baking oven 12 and an integrated emissions control device 14 including an air recirculating system 16.

The integration of the emissions control device 14 into oven 12 eliminates the problems inherent in external and remotely positioned emissions control devices, such as leakage of alcohol laden polluted air through poorly sealed or cracked ductwork, expensive insulated and sealed ductwork, and expensive and massive support structure. The recirculating system 16 also allows more efficient oven operation by reusing heat used and generated in the emissions control device 14 to treat the product being baked. Also, the recirculating system is adapted to handle the heat variations caused by the unstable flow of alcohol emitted from the baked product, thus ensuring that the oven performs in a consistent and controllable manner.

Oven 12 (FIG. 1) may basically be of any type generally known in the art, and includes a top wall 20, sidewalls 21, and end wall 22, and a bottom wall or floor 23 forming an enclosure 24 having an open interior. Various openings (not shown) are formed in walls 20–24 to facilitate infeed and output of product 26 to be baked, and for connection of utilities and the like to components inside enclosure 24. A conveyer 28 including a wire moveable member 30 such as a wire mesh belt, side chains, etc. is operably positioned in enclosure 24 for transporting product 26 through oven 12. Multiple burners or jets of heated air 32 are positioned adjacent conveyor member 30 for baking the product 26. Recirculating system 16 includes air distribution ductwork 34 which may be completed to a plurality of nozzles 35 aligned and cooperating with the burners or jets 32 that direct hot air against product 26 to achieve an impingement baking of the product, as described below. Alternatively, the ductwork 34 may simply feed back into the interior of the oven to help maintain baking temperatures.

Recirculating system 16 includes an exhaust collection duct 36 attached to the inside of oven top wall 20 that collects contaminated air "A1" filled with water vapor and alcohol emitted from the baked product 26, the water and alcohol being by-products of the fermentation and baking process involved in making product 26. The contaminated air "A1" is drawn into exhaust collection duct 35 through openings 38 spaced along the length of exhaust collection duct 36. Exhaust collection duct 36 includes an end section 40 that extends through top wall 20 to the input side of a fan 42. Fan 42 is positioned on top wall 20 and is purposefully located outside of the heated baking enclosure 24 to lengthen the service life of fan 42 and facilitate maintenance. Fan 42 includes an outlet duct 44 that feeds air A1 back through oven top wall 20 toward emissions control device 14.

Emissions control device 14 is positioned within enclosure 24 and includes an inlet duct 46 that splits into a recirculation feeding branch 48 and a treatment feeding branch 50. The flow of air into the treatment feeding branch 50 is controlled by an air flow divider/damper valve 52. Thus, contaminated air "A1" is divided into a recirculation airstream "A2" and a second airstream "A3" to be cleaned by removal of the contaminants therein. Notably, divider valve 52 can be preset to yield a desired ratio of airstream "A2" to "A3". Divider/damper valve 52 can be manually adjusted to adjust for various product runs having different alcohol and water generating or contaminant generating characteristics. Air A2 flowing through the circulating branch 48 is directed by fins 54 through an air restrictor 56 to a heat exchanger 58. Restrictor 56 creates a uniform pressure and causes a more uniform distribution of air through heat exchanger 58. Air A2 is then routed through a recirculation duct 60 to distribution ducts 34 in oven 12.

Treatment feeding branch 50 includes a burner 62 for further heating the air from stream A1 entering stream A3, a filter 64 for capturing large particle matter entrained within air flow A3, and further includes a catalytic oxidizer 66 including a pyrolyzer and catalyst for removing contaminants, primarily alcohol, from the air flow A3, thus cleaning the air A3 to form clean treated air A4. Notably, an incinerator can also be used in place of catalytic oxidizer 66. Fins 70 and 72 direct clean air stream A4, which is about 700° F. as it leaves catalytic oxidizer 66 (or which is about 1400° F. if an incinerator is used) uniformly into a second separate infeed to heat exchanger 58. As clean air A4 moves through heat exchanger 58, heat is transferred from clean air A4 to recirculation air A2, lowering the temperature of air A4 to about 600° F. at the point where it enters an exhaust stack 68 that extends through oven top wall 20 to a remote location for venting. An auxiliary vent 74 including a damper valve 76 allows a predetermined amount of the hot clean air A4 to be drawn off before it enters exhaust stack 68 and rerouted back into recirculation duct 60, or elsewhere if desired to permit greater control of the heat added to the baking process by the apparatus. Recirculation duct 60 is connected to distribution duct 34 which directs the hot gas back to the baking chamber where its impingement on the product enhances the bake.

Notably, in apparatus 10, fan 42 is positioned outside of the enclosure 24 to improve service life and also facilitate servicing, but the entire recirculation system 16 (including distribution ducts 34, exhaust collection ducts 36, and the various ducts of emissions control device 14) is substantially within enclosure 24. Therefore, leaks in any of these ducts do not result in contaminated air being released outside of enclosure 24 in an uncontrolled manner. This allows use of less expensive joints and the like. Still further, all of the heat generated from emissions control device 14 is retained within enclosure 24 except for fan 42 and the ductwork immediately adjacent fan 42, and the exhaust stack 68. Thus, the emissions control device disposed in a heated environment in the first instance, whereby less heat is lost during its operation and less need be added to maintain its operation. Further, any heat lost from emissions control device 4 is already within enclosure 24 and so merely helps maintain the desired baking temperatures. In those portions of emissions control device 14 protruding through the walls of enclosure 24, the heat and/or cracks potentially causing loss of contaminated air can be easily controlled. Still further, vented exhaust air being sent through the heat exchanger 58 can be funneled off back into the oven as desired. Still further, the equipment can be installed as a package, and significant massive superstructure and/or other structural work to the building receiving the oven can be avoided.

Additional apparatus 10A, 10B, 10C and 10D embodying the present invention are shown in FIGS. 2–5, respectfully. To reduce redundant discussion, components and features comparable to those of apparatus 10 are identified with identical numbers, but with the addition of the letters A, B, C, etc. added thereto.

Apparatus 10A (FIG. 2) includes an oven 12A and an emissions control device 14A including an air recirculating system 16A. Apparatus 10A is quite similar to apparatus 10, but includes automatically controlled damper valves 52A and 76A which are operably connected to and controlled by a controller 80A. Appropriate sensors are provided at desired locations and connected to controller 80A to provide input data to the latter so that adjustments can be made to valves 48A and 76A to control air flow. The control of the air flow depends on a number of variables such as the amount of alcohol being emitted from the product, the amount of water vapor present in the air including that being emitted from the product, temperatures within and without the oven, etc. Notably, in apparatus 10A, the emissions control device 14A is located in a position spaced from end wall 22A and sidewalls 21A. This allows product 26A to be routed along and adjacent the output ducts 82A and 84A from heat exchanger 58A (product 26A and 28A being shown as moving through oven 12A in a number of superimposed flights, as would be true for example in a spiral-type oven). Accordingly, as illustrated by apparatus 10A, it will be appreciated that the particular location of the emissions control device can be varied within the oven enclosure 24A. There are a number of different reasons for locating the emissions control device in different locations, including such reasons as providing a desired distribution or flow of air within the oven, logistical needs such as the location of utility inputs to the emissions control device 14A, etc.

Apparatus 10B (FIG. 3) includes a second fan 84B located adjacent fan 42B. Fan 84B is connected to the output of fan 42B by a duct 85A and is adapted to draw a predetermined amount of air from the branch 46B and feed the same into treatment feeding branch 50B. The volume of air moved by fan 84B can be controlled by either a manual or automatic controller (not specifically shown).

Figure 4:
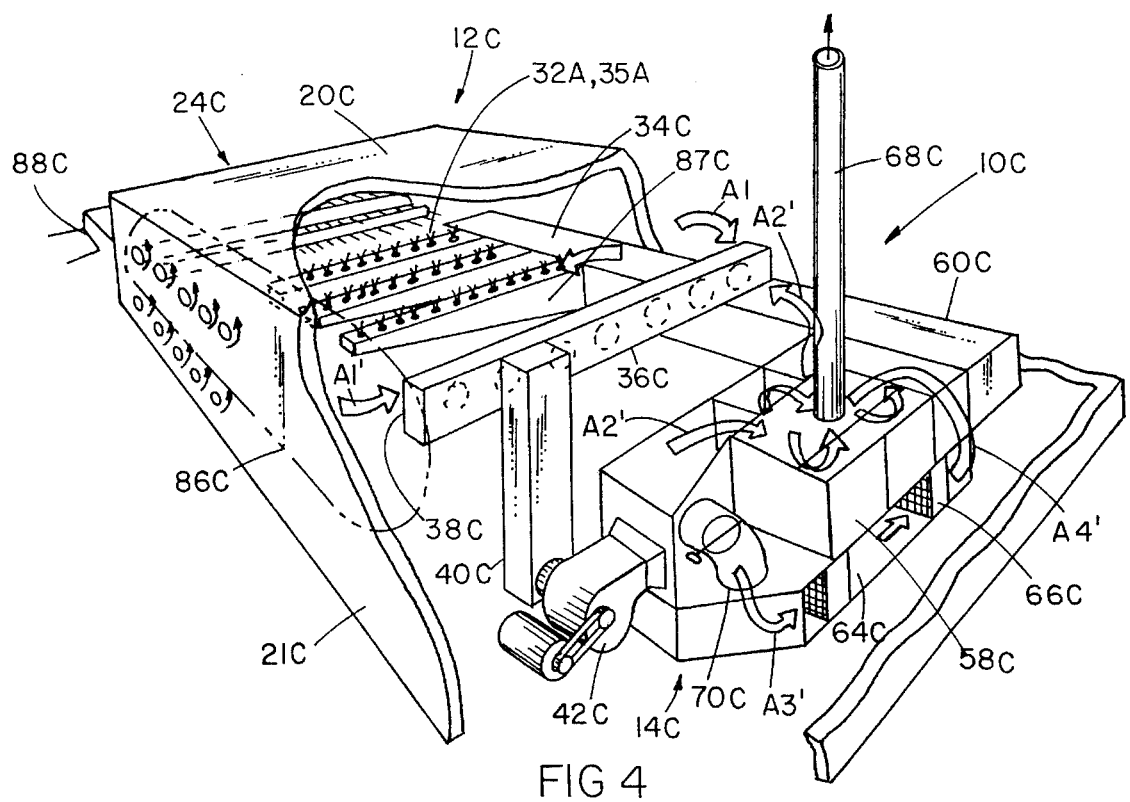
FIG. 4 is a partially broken-away perspective view of a fourth embodiment oven of the present invention.
Figure 5:
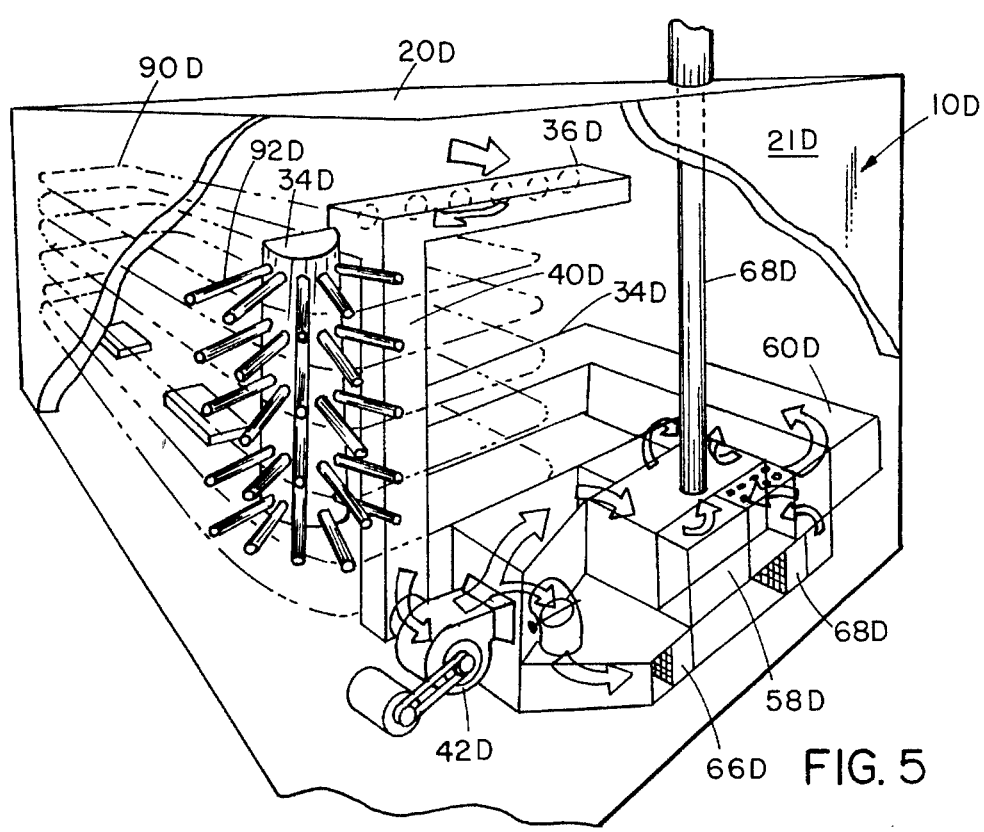
FIG. 5 is a partially broken-away perspective view of a fifth embodiment oven of the present invention.

Apparatus 10C (FIG. 4) includes an oven 12C having a continuous conveyer 86C located within the oven (e.g., a tray or pan-type conveyor having a chain along each side that pivotally supports a plurality of baking trays or pans extending therebetween along their length). Conveyer 86C extends longitudinally within enclosure 24C in two superimposed runs, one advancing and the other returning. Product is input at an opening 88C through sidewall 21C onto the pans of conveyer 86C. Conveyer 86C is constructed to transport the product along the length of the oven and, without spilling the product, return the product to the input area, whereupon the product is removed through opening 88C (slightly below the input height). Notably, fan 42C is located within enclosure 24C, although fan 42C could also be mounted outside of oven enclosure 24C. Nozzles 32A and 35A are positioned along conveyer 86C on projecting distribution arms 87C that extend laterally from a supply plenum 34. Preferably, emissions control device 14C is located at an end of oven 12C opposite opening 88C, although alternative positions are also contemplated. The flow of air in FIG. 4 is indicated by addition of a prime to the alphanumeric designations, such as by A1', A2', A3' and A4', which air flows are comparable to the air flows A1, A2, A3 and A4 discussed above in regard to oven 10 (FIG. 1).

Apparatus 10D (FIG. 5) is similar to apparatus 10C but includes a "spiral-type" oven having a serpentine conveyer 90D and air directing tubes 92D extending from air distribution ductwork 34. Tubes 92D direct hot air directly against the product, thus improving the baking time and energy efficiency.

Figure 7:
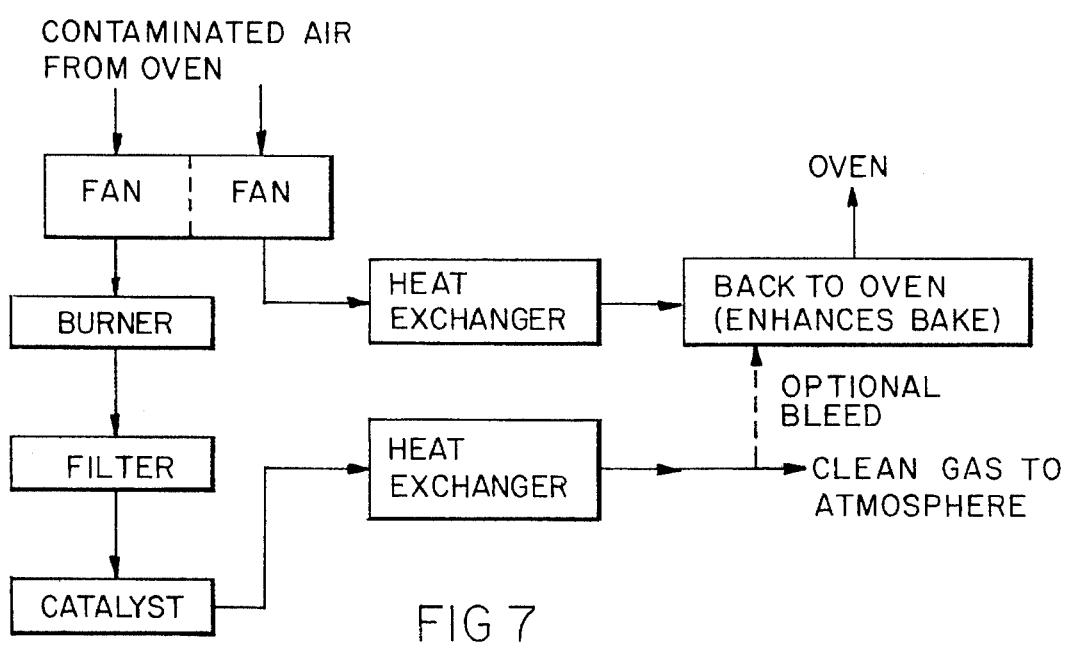
FIG. 7 is a functional block diagram illustrating the air flow and general operation of a system in accordance with the invention.

Thus, multiple embodiments of an apparatus for baking or drying dough-type or other such products is provided, including an oven defining an enclosure with burners and/or heated air impingement jets, a product supporting conveyor in the enclosures, an integrated emissions control device for eliminating or reducing emissions from the product while baking, and a recirculating system for controllably directing air to and from the enclosure and to and from the emissions control device. A heat exchanger is operably connected to the emissions control device and the recirculating systems so that a first portion of the contaminated air collected by the recirculating system from the enclosure is communicated to the emissions control device for cleaning and then is communicated through the heat exchanger and vented to atmosphere. A second portion of the contaminated air collected by the circulating system is communicated through the heat exchanger and is recirculated within the enclosure to assist in the baking. The recirculating system is adjustably controllable to handle surges in emissions such as surges in alcohol vapor content or water vapor content in the air. The clean air from the first portion can be proportionately fed back into the recirculating air to further assist in the baking process and to conserve overall energy costs in the baking process. These flow paths and this general operation is further illustrated by the functional block diagram shown in FIG. 7, which should be considered in conjunction with the foregoing description of preferred embodiments and the examples shown in FIGS. 1–5 inclusive.

The foregoing description is of preferred embodiments only, and it will be readily appreciated by those skilled in the art that modifications may be made to such embodiments, and the invention may be implemented in other particular ways without departing from the concepts disclosed. All such modifications and other embodiments are to be considered as included in the following claims, unless these claims by their language expressly state otherwise.

The embodiments of the invention in which an exclusive property or privilege is claimed are defined as follows:

1. An apparatus for baking a dough-based product which releases environmental contaminants during baking, comprising:

a combustion-type, commercial oven including an enclosure with walls, burner means for heating the air in said enclosure to bake the product, and automated means for positioning the product inside said enclosure;

an emissions control device of high-volume capacity suitable for commercial application, for removing at least certain of said contaminants from said heated oven air by addition of thermal energy to such air; and a recirculation system operably connected to said oven and said emissions control device for recirculating at least certain of the hot air from said emissions control device to said enclosure, said emissions control device being integrally associated with and located closely proximate to said oven so that thermal energy from said emissions control device can be readily communicated to said oven, whereby the integral association of said emissions control device with said recirculation system and said oven facilitates installation and operation of said baking apparatus.

2. An apparatus as defined in claim 1 wherein said emissions control device is located at least partially within said enclosure.

3. An apparatus as defined in claim 2 including an exhaust stack and further including a heat exchanger having an air heating portion and an air cooling portion, and wherein said recirculation system includes first ducting communicating a first stream of the heated air in said oven into said emissions control device and from said emissions control device to the air cooling portion of said heat exchanger and subsequently to said exhaust stack, and further includes second ducting communicating a second stream of the heated air to the air heating portion of the heat exchanger and then back to the enclosure.

4. An apparatus as defined in claim 3 wherein said recirculation system includes a damper valve controlling the ratio of the hot air communicated in the first stream to the hot air communicated in the second stream.

5. An apparatus as defined in claim 4 wherein said damper valve includes an automatic control.

6. An apparatus as defined in claim 1 wherein said emissions control device is located within said enclosure.

7. An apparatus as defined in claim 1 wherein said means for positioning the product includes a conveyor adapted for moving baking dough-type products through a hot enclosure.

8. An apparatus as defined in claim 7 wherein said conveyor includes a moveable member extending substantially the length of said oven.

9. An apparatus as defined in claim 7 wherein said conveyor includes a plurality of vertically tiered runs.

10. An apparatus as defined in claim 7 wherein said conveyor extends around said emissions control device.

11. An apparatus as defined in claim 1 including a controller operably connected to said means for heating the product, said means for holding the product, said recirculation system, and said emissions control device; said controller being constructed to control the flow of air within said oven and the temperature of such air.

12. An apparatus as defined in claim 11 including damper valves located within said recirculation system for controlling the flow of hot air through said emissions control device, for controlling the flow of hot air from said emissions control device to atmosphere, and for controlling the flow of hot air from said emissions control device back into said oven.

13. An apparatus as defined in claim 1 wherein said recirculation system includes air flow directing nozzles, said nozzles being oriented to direct recirculated hot air at said product to more efficiently bake said product.

14. An apparatus as defined in claim 13 including an exhaust stack connected to said emissions control device for remotely dispensing air cleaned by said emissions control device, and an auxiliary duct connecting said exhaust stack to said oven for communicating the cleaned hot air from said exhaust stack into said oven.

15. An integrated emissions control apparatus and oven for baking a product which releases organic-type environmental contaminants non-uniformly during operation, comprising:

a combustion-type burner-operated commercial oven suitable for baking products in high volume, including an enclosure having an outlet vent and a conveying device therein for moving the products through the enclosure;

a high volume commercial emissions control device including return air ductwork, for treating and reducing the level of contaminants in air from said oven prior to passing a selected portion of the treated air through said ductwork to a predetermined location or locations in said enclosure while selectively passing another portion of the treated air outwardly through said vent; and said emissions control device and return air ductwork being integrated with and located substantially entirely within said oven enclosure and being characterized by an absence of return air ductwork located outside of the enclosure that extends from the emissions control device to the enclosure, whereby thermal energy generated from chemical reactions involving said organic-type contaminants are captured within the enclosure without dependency on or inefficiencies resulting from use of air-tight insulated ductwork outside said enclosure between the emissions control device and the enclosure.

16. An apparatus as defined in claim 15 including a recirculation system for recirculating air from said oven through said emissions control device and returning at least a portion of such air to the inside of said oven.

17. An apparatus as defined in claim 16 wherein said recirculation system includes a fan mounted on the outside of said enclosure and duct means connecting said fan in air flow communication to said enclosure and said emissions control means, said fan arranged and adapted to move air through said recirculation system.

* * * * *